United States Patent
Coles et al.

(10) Patent No.: US 11,852,185 B2
(45) Date of Patent: Dec. 26, 2023

(54) JOINT ASSEMBLY

(71) Applicant: ROLLS-ROYCE PLC, London (GB)

(72) Inventors: David R Coles, Derby (GB); Daniel Clark, Belper (GB)

(73) Assignee: ROLLS-ROYCE plc, London (GB)

( * ) Notice: Subject to any disclaimer, the term of this patent is extended or adjusted under 35 U.S.C. 154(b) by 242 days.

(21) Appl. No.: 17/064,895

(22) Filed: Oct. 7, 2020

(65) Prior Publication Data

US 2021/0131466 A1    May 6, 2021

(30) Foreign Application Priority Data

Oct. 31, 2019  (GB) ..................... 1915814

(51) Int. Cl.
*F16B 7/04*  (2006.01)
*F16B 5/00*  (2006.01)

(52) U.S. Cl.
CPC .......... *F16B 5/0088* (2013.01); *F16B 7/0406* (2013.01)

(58) Field of Classification Search
CPC ...... F01D 25/24; F16B 7/0406; F16B 7/0426; F16B 21/18; F16B 21/183; F16B 21/186; F16B 3/04; F16B 5/0084; F16B 7/0413; F16B 7/042; F16B 21/07; F16B 21/073; Y10T 403/581; Y10T 403/7018; Y10T 403/7045; Y10T 403/7092; Y10T 403/45; Y10T 403/453; Y10T 403/459;

(Continued)

(56) References Cited

U.S. PATENT DOCUMENTS

| | | | | |
|---|---|---|---|---|
| 2,417,195 A | * | 3/1947 | Hargreaves | H02K 5/04 |
| | | | | 310/85 |
| 2,429,284 A | * | 10/1947 | Wildhaber | F16D 11/14 |
| | | | | 403/364 |

(Continued)

FOREIGN PATENT DOCUMENTS

| | | |
|---|---|---|
| DE | 29608706 U1 | 8/1996 |
| GB | 2531154 B | 5/2017 |

OTHER PUBLICATIONS

Feb. 25, 2021 Search Report issued in European Patent Application No. 20201250.6.

(Continued)

*Primary Examiner* — Amber R Anderson
*Assistant Examiner* — Zachary A Hall
(74) *Attorney, Agent, or Firm* — Oliff PLC

(57) ABSTRACT

A joint assembly joins first and second components about a common axis. The first component has a first end portion having a radially outwardly facing surface shaped to fit radially inside a second surface of a hollow second end portion of the second component to form an interface between the opposing first and second surfaces. The first and second surfaces have a concavity extending laterally with respect to the axis such that when the first and second surfaces are opposingly arranged the opposing concavities define a cavity at the interface. A retaining member is insertable into the cavity at the interface to prevent axial separation of the first and second components. One of the first and second end portions has a free end protrusion axially spaced from the concavity and the other of the first and second end portions has an axially extending recess arranged to receive the free end.

17 Claims, 8 Drawing Sheets

(58) Field of Classification Search
CPC ....... Y10T 403/64–648; F05D 2220/32; F05D 2260/36; F16L 23/006; F16L 27/1012; F16L 27/1021; F16L 27/1025; F16L 37/08; F16L 37/14; F16L 37/142; F16L 37/148; F16L 47/14; F16L 49/04
USPC ................ 403/220, 223, 229, 335–338, 380, 403/DIG. 14; 285/318, 321
See application file for complete search history.

(56) References Cited

U.S. PATENT DOCUMENTS

| | | | |
|---|---|---|---|
| 3,181,897 A * | 5/1965 | Krayenbuhl | F16L 37/148 285/305 |
| 3,600,011 A * | 8/1971 | Alvis | F16L 37/148 285/305 |
| 5,219,190 A | 6/1993 | Grammel, Jr. | |
| 5,286,135 A * | 2/1994 | James | F16L 37/148 403/376 |
| 5,737,913 A * | 4/1998 | Terry | F01D 25/243 415/214.1 |
| 6,352,385 B1 * | 3/2002 | Wojciechowski | F16D 1/033 403/364 |
| 10,100,961 B2 * | 10/2018 | Benson | F01D 25/243 |
| 2013/0294907 A1 * | 11/2013 | Hoffacker | F16B 19/02 415/214.1 |
| 2014/0161510 A1 | 6/2014 | James | |
| 2016/0177785 A1 | 6/2016 | Benson | |

OTHER PUBLICATIONS

Apr. 15, 2020 Search Report issued in British Patent Application No. 1915814.6.

* cited by examiner

JOINT ASSEMBLY

This specification is based upon and claims the benefit of priority from UK Patent Application Number GB 1915814.6 filed on 31 Oct. 2019, the entire contents of which are incorporated herein by reference.

BACKGROUND

Overview of the Disclosure

The present disclosure relates to a joint assembly, particularly to a joint assembly for locking two components together.

Background of the Disclosure

Most gas turbine engines employ conventional nut and bolt configurations to secure together the main structural engine components, such as fan and body casing parts. The temperature of gases passing through the engine can range between approximately 700° and approximately 2500° C. which can cause thermal cycling problems. As the engine temperature varies through such a temperature range, bolts tend to gall and seize. This can require the bolts to be drilled out during the disassembly of the engine, which is expensive and time-consuming.

In addition, the use of nuts and bolts requires suitable flanges to be provided on the parts to be joined, which adds to weight and increases assembly time. Furthermore, in some arrangements, bolts heads are positioned in the gas flow path which may disrupt the aerodynamics of the engine and may accelerate the deterioration of the bolt.

United States patent application US 2014/0161510 A1 discloses the use of a joint to lock two cylindrical components to one another. Such an arrangement uses a wire having either a round or square cross section, which is inserted into an annular cavity between the two components through a slot in the outer surface of the assembled components.

In order to ensure that the assembled components are held securely together, it is necessary for the wire to be a close fit in the annular cavity. US 2014/0161510 A1 proposes to use a material of greater thermal coefficient of expansion for the wire than that of either of the two components so that the wire is a close fit in the annular cavity when the joint is at elevated temperature but the wire is a looser fit when cold, making insertion and removal of the wire easier for assembly, maintenance and repair operations.

However, it has been found that joints of the type disclosed in US 2014/0161510 A1 can be subject to unwanted radial movement between the opposing faces of the joint.

United States patent application US 2016/0177785 A1 proposes a joint with corresponding angularly offset joint faces in each component. An annular cavity is defined in each angularly offset face and a connection member (i.e. wire) is received in each of the two cavities. This provides additional strength in the joint against radial movement but requires the use of two wires instead of one.

It is an aim of the disclosure to provide an alternative joint assembly that is simple to assembly and secure in both axial and radial directions under loading.

SUMMARY OF THE DISCLOSURE

According to a first aspect, the present disclosure provides a joint assembly for joining first and second components about a common axis, the first component comprising a first end portion having a radially outwardly facing surface shaped to fit radially inside a second surface of a hollow second end portion of the second component so as to form an interface between the opposing first and second surfaces, wherein the first and second surfaces each comprise a concavity extending laterally with respect to the axis such that when the first and second surfaces are opposingly arranged, the opposing concavities define a cavity at the interface, the assembly comprising a connection member insertable into the cavity at the interface to prevent axial separation of the first and second components, wherein one of the first and second end portions comprises a free end axially spaced from the concavity and the other of the first and second end portions comprises an axially extending recess arranged to receive the free end.

The free end may be axially insertable into the recess so as to prevent relative movement between the first and second component in a radial direction.

The free end may comprise a protrusion.

The interface, e.g. an intermediate section thereof, may extend in an axial direction. The interface may meet an outer surface of the joint part-way along axial extent of the interface.

The cavity and/or retaining member may be elongate in form. The cavity and/or retaining member may extend in an annular, circumferential and/or lateral direction with respect to the axis.

The retaining member and/or cavity may be helical in form.

The retaining member may be formed of, or comprise, a resilient material.

The retaining member may be receivable within the cavity to thereby interlock the first component and the second component to one another.

According to a second aspect, the present disclosure provides a gas turbine engine that includes a joint assembly according to the first aspect.

The skilled person will appreciate that except where mutually exclusive, a feature described in relation to any one of the above aspects may be applied mutatis mutandis to any other aspect disclosed herein. Furthermore' except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
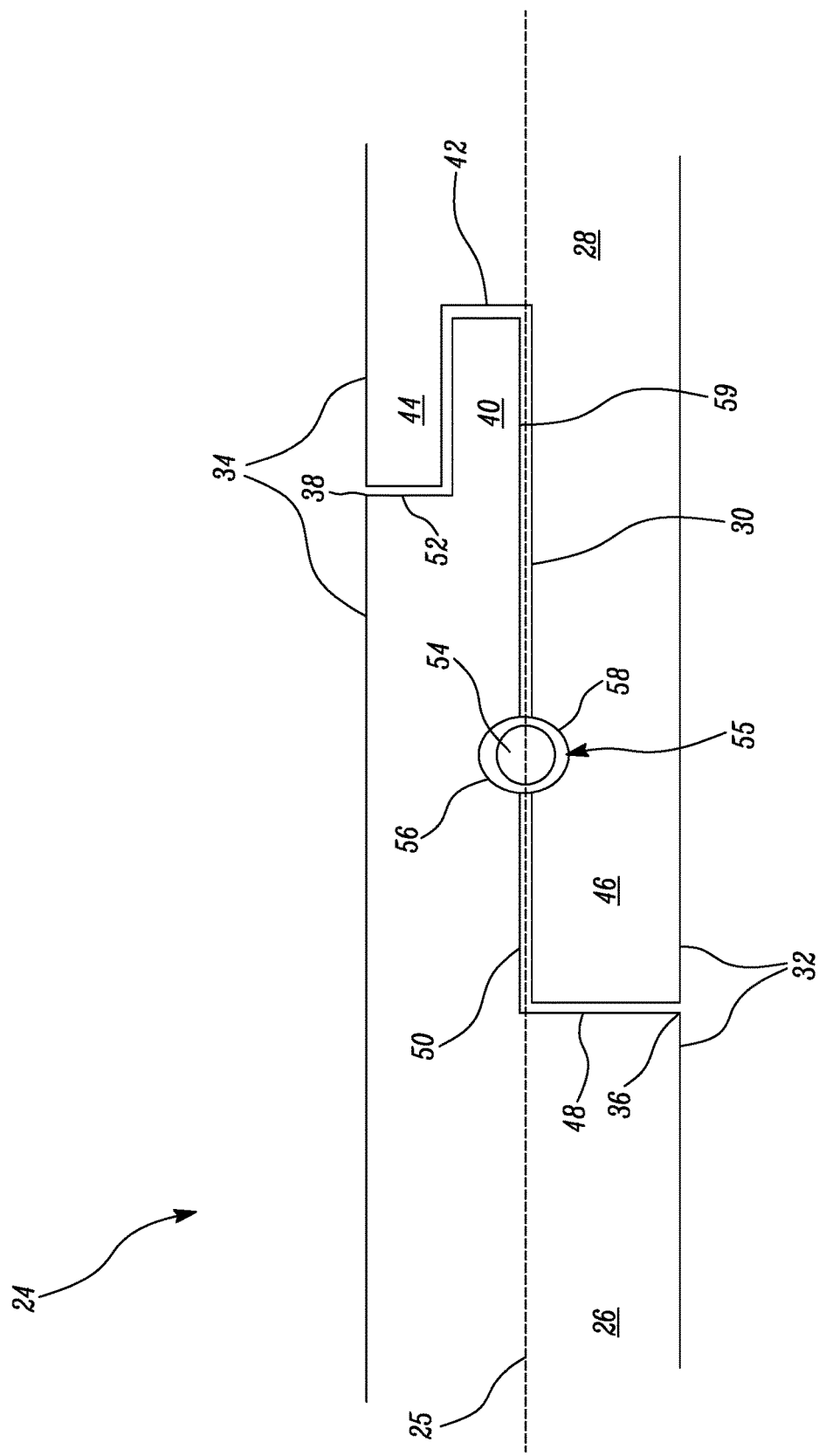
FIG. 1 is a longitudinal section through a first example of a joint.

FIG. 1 shows a sectional view through a joint assembly 24 according to a first example of the disclosure.

The joint assembly 24 comprises a first member 26 and a second member 28, joined together at an interface 30 located between opposing surfaces of the first and second member. The joint assembly 24 is configured to unite the first and second member to provide a releasable or permanent connection therebetween.

In this example, the first 26 and second 28 members are annular in form and the joint assembly 24 is for a revolute component. Both the first and second members are hollow. In other examples, only the first member 26, or an end portion thereof, need be hollow and the second member 28 could have a solid interior. Furthermore, the first 26 and second 28 members need not be circular in cross-section and could be elliptical or polygonal in different examples.

It will be appreciated that only one half of the joint section is shown in the examples herein, i.e. a single wall section, and the other half of the joint section will be the same, albeit rotated through 180 degrees or a mirror image of the section shown. The interface 30 may be constant around the periphery/circumference of the joined members 26 and 28.

The first and second member extend in an axial direction along an axis 25. The joint assembly has a depth/thickness dimension between a first/inner surface 32 and a second/outer surface 34. The first and second member extend in a lateral direction (i.e. in and out of the page).

The joint is formed in the vicinity of an end of the first member 26 and/or second member 28. In other examples, the joint may be located at an axially offset position from the end of the first member 26 and/or second member 28, i.e. part-way along the interior/exterior of one member. For example, the joint may be located on a protrusion offset from the end of the first member 26 and/or second member respectively.

The joint is formed over a depth or wall thickness between the first surface 32 and the second opposing surface 34. In this example the first surface 32 is a common surface shared by the first 26 and second 28 members. The second surface 34 may also be a common surface shared by the first 26 and second 28 members. As such the first and second members may be a common wall thickness and the joint may be formed over an overlapping region of the first and second members of reduced wall thickness.

The first and second members may each have a wall thickness over the extent of the joint that is a fraction, e.g. half, the depth dimension of the joint between the first 32 and second 34 surfaces.

The interface 30 extends over an axial length defining the extent of overlap between the first and second members. The interface 30 also extends radially so as to span the first 32 and second 34 surfaces.

The location 36 of the interface 30 at the first surface 32 is axially offset from the location 38 of the interface 30 at the second surface 34. The axial distance/spacing between the locations 36 and 38 is less than the axial extent of the interface 30. As such, the first member 26 comprises a protrusion 40 and the second member 28 comprises an opposing recess 42 as will be described below. The interface 30 thus doubles back at least part way upon itself such that the axial extent of the interface 30 is greatest along central axis 25.

The shape of the first and second members and interface 30 may provide a scarfed joint.

The first member 26 comprises a protrusion 40 to provide restraint in the depth/radial direction. The protrusion 40 extends in an axial direction from the first member 26 and is of reduced wall thickness, e.g. so as to define a tab or cuff portion. The protrusion defines the tip/end of the first member 26

The protrusion 40 may extend in an axial direction parallel to the axis 25 of the first or second member. Alternatively, the protrusion may extend at an angle with respect to the axis of the first or second member. The protrusion is located part-way between the first surface 32 and the second surface 34, e.g. at or adjacent the central axis 25.

The second member 28 comprises an internal recess 42 configured to receive the protrusion 40 and prevent movement of the protrusion 40 in a radial/depth direction once the joint is assembled.

The protrusion 40 is locatable in the space/recess 42 formed between a first portion 44 and a second portion 46 of the second member 28. The first portion 44 defines an overhang between the protrusion 40 and the second surface 34. The second portion 46 is located between the protrusion 40 and/or axis 25 and the first surface 32.

The protrusion 40 and recess 42 arrangement provides a lapped joint.

The interface 30 may comprise a first section 48. The first section 48 extends into the joint from location 36 on the first surface 32, e.g. in a direction offset from the surface 32 and/or axis 25. The first section 48 may extend in a direction that is oblique or substantially perpendicular to the first surface 32 or axis 25.

The interface 30 may comprise a second section 50. The second section may be located at a midpoint, e.g. part-way or half-way between the first surface 32 and the second surface 34. The second section 50 may extend in a direction parallel to the axis 25 of the first and second member. An edge 59 of the protrusion 40 may be aligned with the second section 50.

The interface 30 may comprise a third section 52. The third section 52 extends into the joint from location 38 on the second surface 34, i.e. in a direction that is offset from the surface 34 and/or axis 25. The third section 52 may extend in a direction that is oblique or substantially perpendicular to the second surface 34 or axis 25.

The joint assembly 24 comprises a retention member 54 located at the interface 30 between the first member 26 and the second member 28. The retention member 30 is configured to prevent relative axial movement of the first and second member and thus retain the joint between the first and second members.

The retention member 54 may comprise an elongate member such as a rod or a wire. The retention member 54 may be helical in form. The retention member 54 may comprise a circular, elliptical or polygonal cross-sectional profile.

The retention member 54 is located within a cavity 56, 58 that is formed by opposing first 56 and second 58 concavities located respectively on the first member 26 and the second member 28. The opposing concavities are aligned at the interface 30 (i.e. at the section 50 thereof) to create an internal cavity 55 within the joint across the interface 30, into which the retention member 54 can be inserted to hold the joint assembly together.

The retention member 54 may have a cross sectional profile that substantially matches that of the cavity 55. The first concavity 56 and/or the second concavity 58 may have a depth such that the cavity 55 has a greater depth dimension than that of the retention member 54

The retention member 54 and cavity 55 may be located part way along the second section 50 of the interface 30, e.g. at the axis 25.

Further details of the retention member 54 and its insertion into the cavity 55 can be found in US 2014/0161510 A1 and US 2016/0177785 A1, and will not be repeated here for conciseness.

Figure 2:
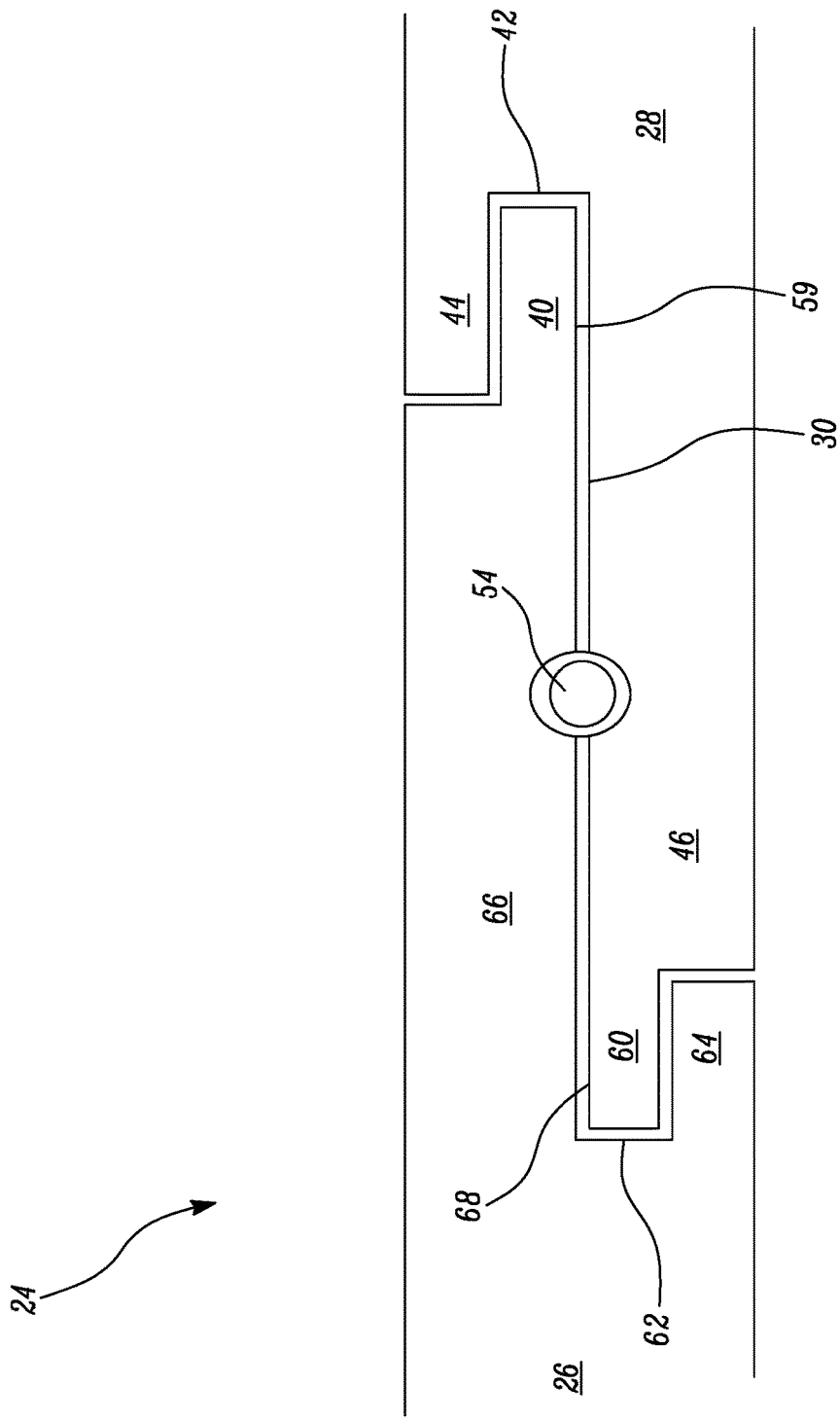
FIG. 2 is a is a longitudinal section through a second example of a joint.

FIG. 2 shows a joint assembly 24 according to a second example of the disclosure.

The second example is substantially the same as the example shown in FIG. 1, however, the second member 28 comprises a further protrusion 60 on the second member 28.

The further protrusion 60 extends from the second member 28 in an axial direction opposite to that of the protrusion 40. The further protrusion 60 may extend in an axial direction parallel to the axis 25 of the first or second member. Alternatively, the further protrusion 60 may extend at an angle with respect to the axis of the first or second member. The further protrusion 60 may be located internally within the joint, i.e. at a point between the first surface 32 and the second surface 34.

The first member 26 comprises a recess 62 configured to receive the further protrusion 60 and prevent movement of the further protrusion 60 in a radial/depth direction. The further protrusion 60 and/or recess 62 is located between a first portion 64 and a second portion 66 of the first member 26. The first portion 64 is located between the further protrusion 60 and the first surface 32 and defines an overhang. The second portion 66 is located between the further protrusion 60 and the second surface 34.

The protrusion 40 and the further protrusion 60 and their respective cavities provide a double lapped joint.

An edge 68 of the further protrusion 60 may be aligned with the section 50 of the interface 30 and/or axis 25. The edge 68 of the further protrusion 60 may additionally or alternatively be aligned/parallel with the edge 59 of the protrusion 40. The protrusion 40 and the further protrusion 60 may extend parallel to one another but in opposing directions.

The protrusion 40 and/or the further protrusion 60 may be rectangular in section as shown I FIGS. 1 and 2.

Figure 3:
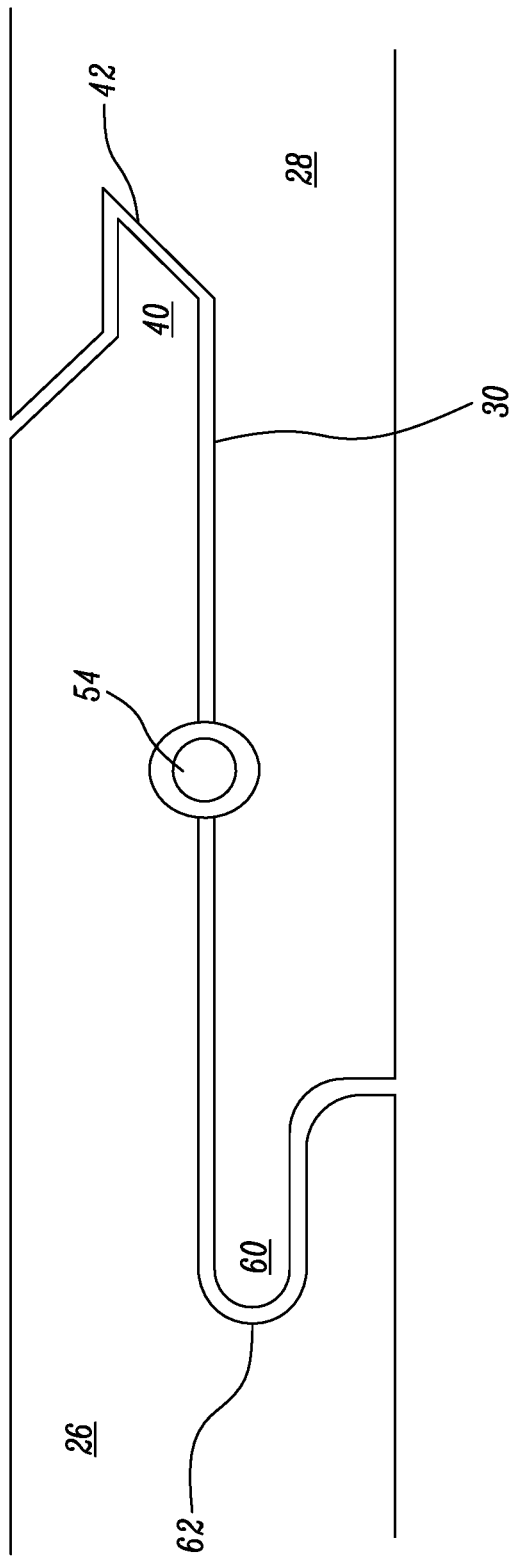
FIG. 3 is a longitudinal section through a third example of a joint.

As shown in FIG. 3, the protrusion 40 and/or the further protrusion 60 may comprise a non-rectangular cross-section. The protrusion 40 and/or the further protrusion 60 may comprise an arcuate, polygonal and/or chamfered profile. The protrusion 40 and/or the further protrusion 60 may comprise different cross-sections. For example, the protrusion 40 may comprise a polygonal profile and the further protrusion 60 may comprise an arcuate profile. Either protrusion could have an obliquely angled or tapered end face.

The protrusion 40 and/or the further protrusion 60 may comprise a corresponding or different cross-sectional shape or size to the respective cavity. The protrusion 40 and/or the further protrusion 60 and the respective cavities may be provided with an axial tolerance. For example, the protrusion 40 and/or the further protrusion 60 may comprise a smaller axial length than the corresponding cavity, such that a gap is formed between the protrusion and the cavity wall.

Figure 4C:
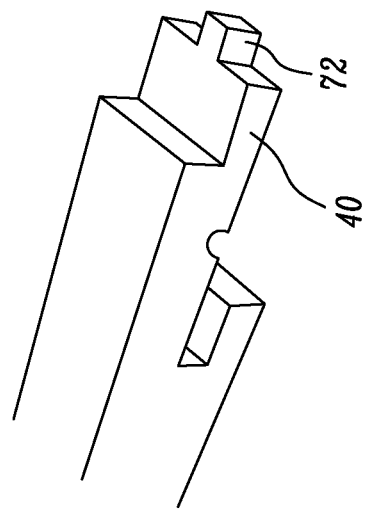
FIGS. 4a-4e show example three-dimensional views of first components for the joint with different lateral alignment/retention features.
Figure 4B:
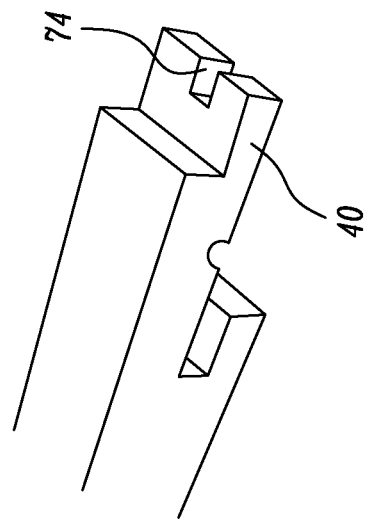
Figure 4E:
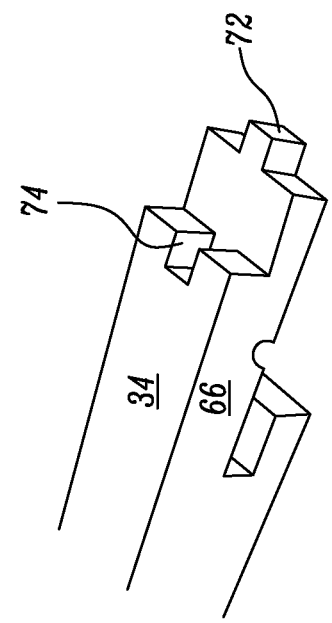
Figure 4A:
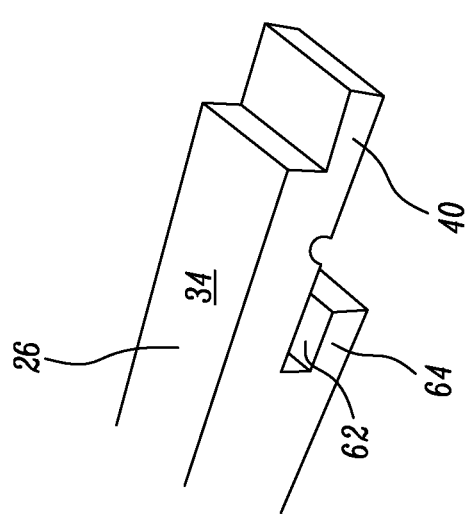

Turning now to the examples of FIG. 4, in FIG. 4*a* there is shown just the first member 26 of the joint assembly of FIG. 2. If this type of joint is provided between tubular members, then the joint may be subject to relative rotation, i.e. slippage in a circumferential direction. FIGS. 4*b*-4*e* show various arrangements for ensuring circumferential alignment of the joint, e.g. to prevent rotation in the joint.

The joint assembly 24 may comprise a tenon 72. The tenon 72 is located on the first member 26 or the second member 28 and is configured to prevent relative transverse (i.e. in a direction in and out of the page) movement between the first and second members. The other of the first or second member comprises a cavity/slot 74 configured to receive the tenon 72.

The tenon 72 and/or cavity 74 may be located in an end face of the respective member, e.g. opposing/abutting end faces of the first and second members. The tenon 72 and/or the cavity 74 may be located on the protrusion 40 and/or the further protrusion 60. The tenon 72 and/or the cavity 74 may located on the first surface 32 and/or the second surface 34 such that they may be visually inspected.

As shown in FIG. 4, the tenon 72 may be provided in a number of different configurations. In each example, the engagement between the tenon and opposing cavity is in an axial direction but the cavity has lateral side walls to prevent lateral movement of the tenon once engaged.

FIG. 4*b* shows a cavity 74 located on the protrusion 40 of the first member 26. A corresponding tenon (not shown) is located within the cavity 42 located on the second member 28.

FIG. 4*c* shows a tenon 72 located on the protrusion 40 of the first member 26. A corresponding cavity (not shown) is located within the cavity 42 located on the second member 28.

Figure 4D:
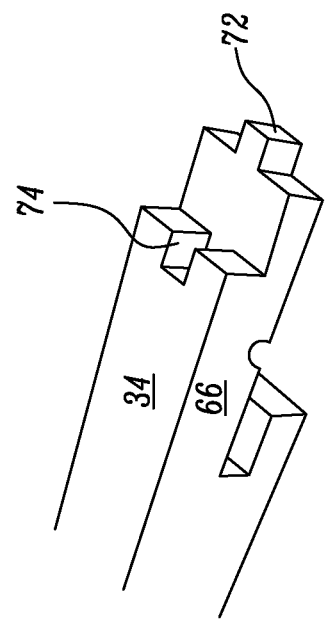

FIG. 4*d* shows a cavity 74 located on the second surface 34 of the first member 26. The cavity 74 is located on second portion 66 of the first member 26 and is accessible when the first and second member have been brought together. A corresponding tenon (not shown) is located on the first portion 44 located on the second member 28.

FIG. 4*e* shows a cavity shows a cavity 74 located on the second surface 34 of the first member 26. The cavity 74 is located on second portion 66 of the first member 26 and is accessible when the first and second member have been brought together. A tenon 72 is located on the protrusion 40. A corresponding tenon (not shown) is located on the first portion 44 located on the second member 28 and corresponding cavity (not shown) is located within the cavity 42 located on the second member 28.

In a further example, the first member 26 comprises a tenon 72 on the protrusion 40 and the first portion 66. In another example, the first member 26 comprises a cavity 74 on the protrusion 40 and the first portion 66.

In other examples, the tenon 72 and/or cavity 74 arrangement is provided on the further protrusion 60 and/or the first portion 46 of the second member 28. The tenon 72 and cavity 74 arrangement may be accessible from the first surface 32. The tenon 72 and/or cavity 74 may be provided on the second member 28 in substantially the same arrangements as described for the first member 26.

In some examples the tenon 72 comprises a pin. The cavity 74 may comprise a cavity suitable to receive a pin, e.g. with a close fit.

Figure 5:
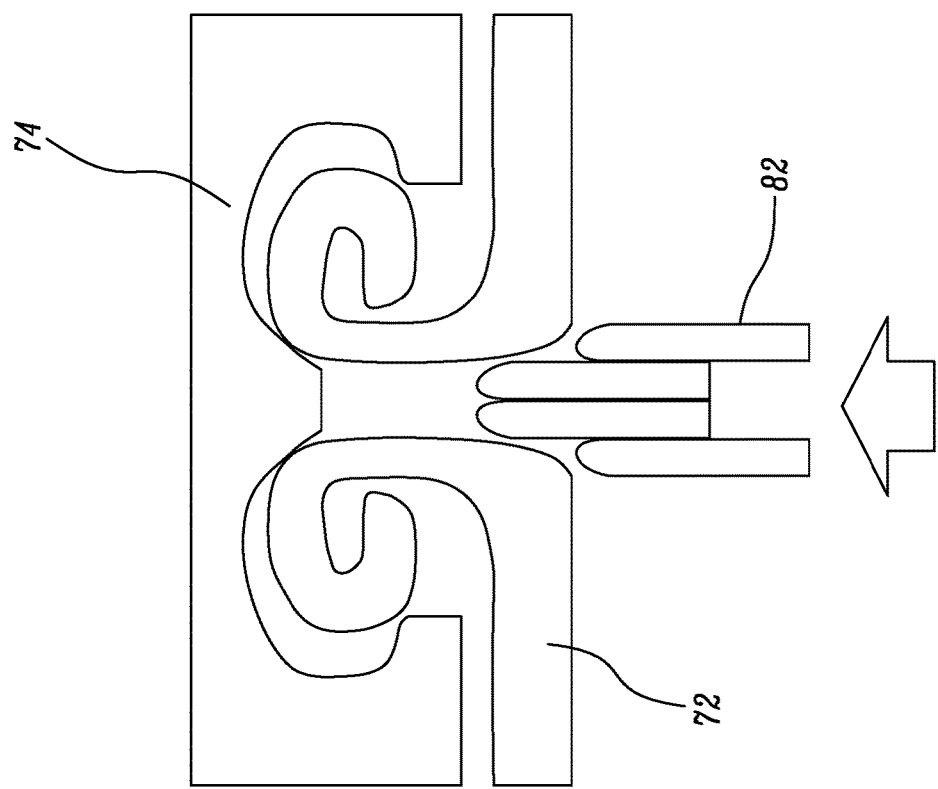
FIG. 5 is a plan view showing further detail of an example of an alignment feature of the joint.
Figure 5:
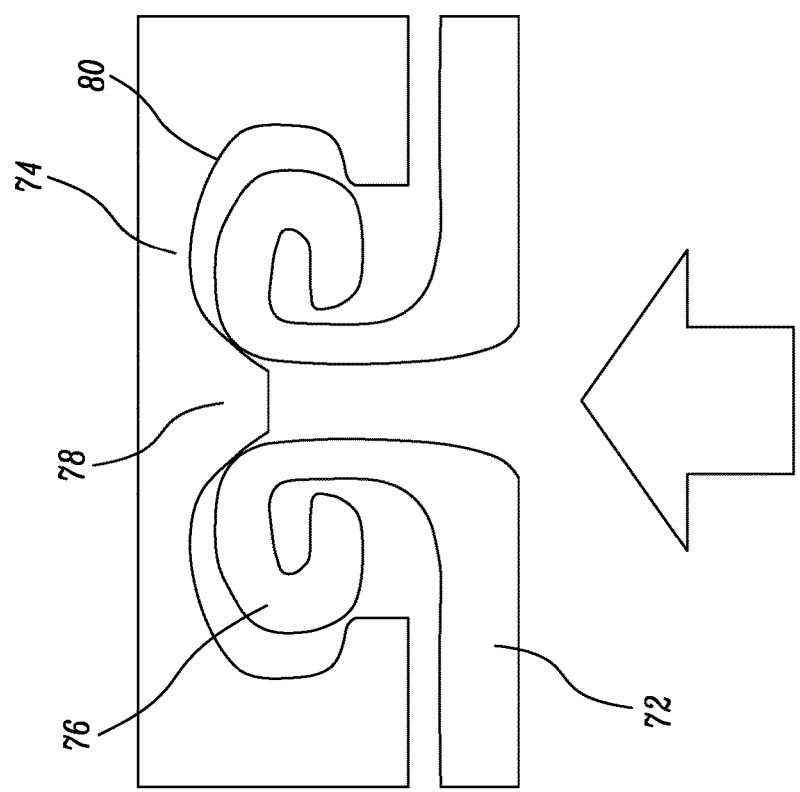

As shown in FIG. 5, in some examples the tenon 72 may comprise a deformable portion 76. The deformable portion 76 may comprise a splayed end configured to be inserted into a cavity 74 and deformed therein to provide a tight fitment between the tenon 72 and the cavity 74.

The cavity 74 may comprise a mandrel 78 configured to push the deformable wall outwards. The cavity 78 may comprise a recessed, curved wall 80 configured to curl the deformable portion 76.

A tool 82 may be provided to push/splay the deformable portion 76 into the cavity 74 and against the mandrel 78.

In some examples, the tenon 72 is moveably attached to the first and/or second member and resiliently biased toward the corresponding cavity 74.

In some examples, the tenon 72 is moveably attached to the first and/or second member and biased toward the cavity via a magnetic force. For example, the tenon 72 may comprise magnetic material. The magnetic material is attracted to the cavity 74 and the tenon 72 moves into the cavity. Alternatively, the tenon 72 comprises a ferromagnetic material and the tenon may be moved into the cavity using an external magnet.

In some examples, the tenon 72 is rotatably mounted to the first and/or second member. The tenon 72 may be rotated from a position where the tenon 72 engages the cavity 74 and a position where the tenon 72 does not engage the cavity 74. The tenon 72 may comprise a locking feature to prevent unintentional rotation of the tenon 72.

In some examples, the tenon 72 and/or the protrusion 40 and/or the further protrusion 60 comprise a material with a different thermal expansion coefficient that the respective cavity into which they are inserted. For example, the tenon 72 comprises a material with a higher thermal expansion coefficient than the respective cavity 74 into which it is inserted, such that during an increase in temperature of the tenon 72 and the cavity 74, the tenon 72 expands more than the cavity 74, thus creating a joint of increased tightness.

The joint assembly 24 may be provided continuously in the lateral direction between the first and second member to provide a continuous joint 30. For example, where the first and second member are annular, a continuous annular joint is provided therebetween.

In other examples, the joint assembly 24 may be provided at discrete locations in the lateral direction between the first and second member to provide a plurality of intermittent joints 30. For example, where the first and second member are annular, a plurality of discrete joints are provided about the circumference of the first and second member to provide an intermittent connection.

The intermittent joints may comprise a wave profile. One of more dimensions of the joint assembly 24 may vary according to wave profile, along the lateral length of the joint. For example, the length of the protrusion and/or the further protrusion 60 may vary sinusoidally along the lateral length of the joint. The peak of the wave profile may provide a joint assembly as herein described, whereas the trough of the wave profile may provide a conventional joint assembly.

Figure 7:
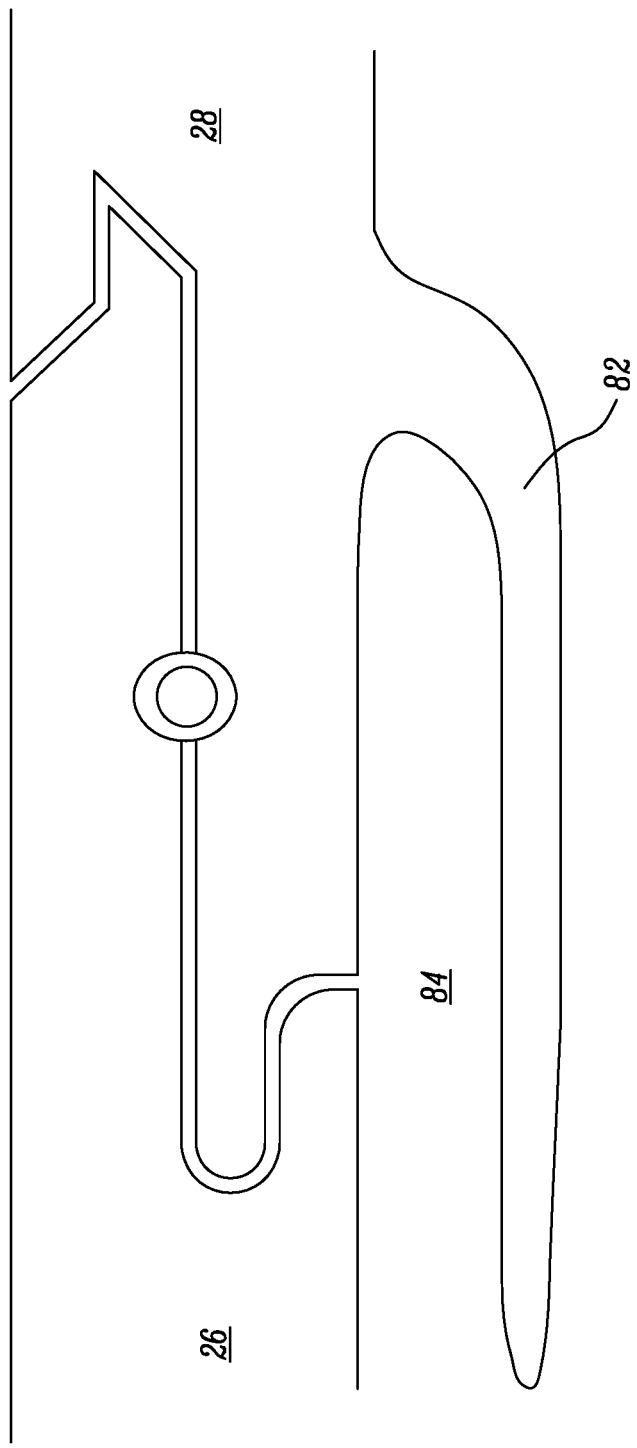
FIG. 7 is a longitudinal section through a further example of a joint.

In an example, the joint assembly 24 comprises a clamping arrangement as shown in FIG. 7. The clamping arrangement allows an object to be clamped to the first and second member. The clamping arrangement may comprise an arm 82. The arm 82 extends substantially parallel to the axis of the first and second member and provides a gap 84 therebetween. The clamping arrangement may comprise a protrusion or locking mechanism to prevent axial movement of the object and prevent it from detaching from the arm 82.

In an example, the joint assembly 24 comprises attachment points for one or more bosses.

In an example, the joint assembly 24 comprises one or more ports for visual inspection. The visual inspection may be provided by a boroscope.

The first and/or second member may comprise a deformable portion to retain the retaining member 54 within the cavities 56, 58 of the first and second members.

Figure 8:
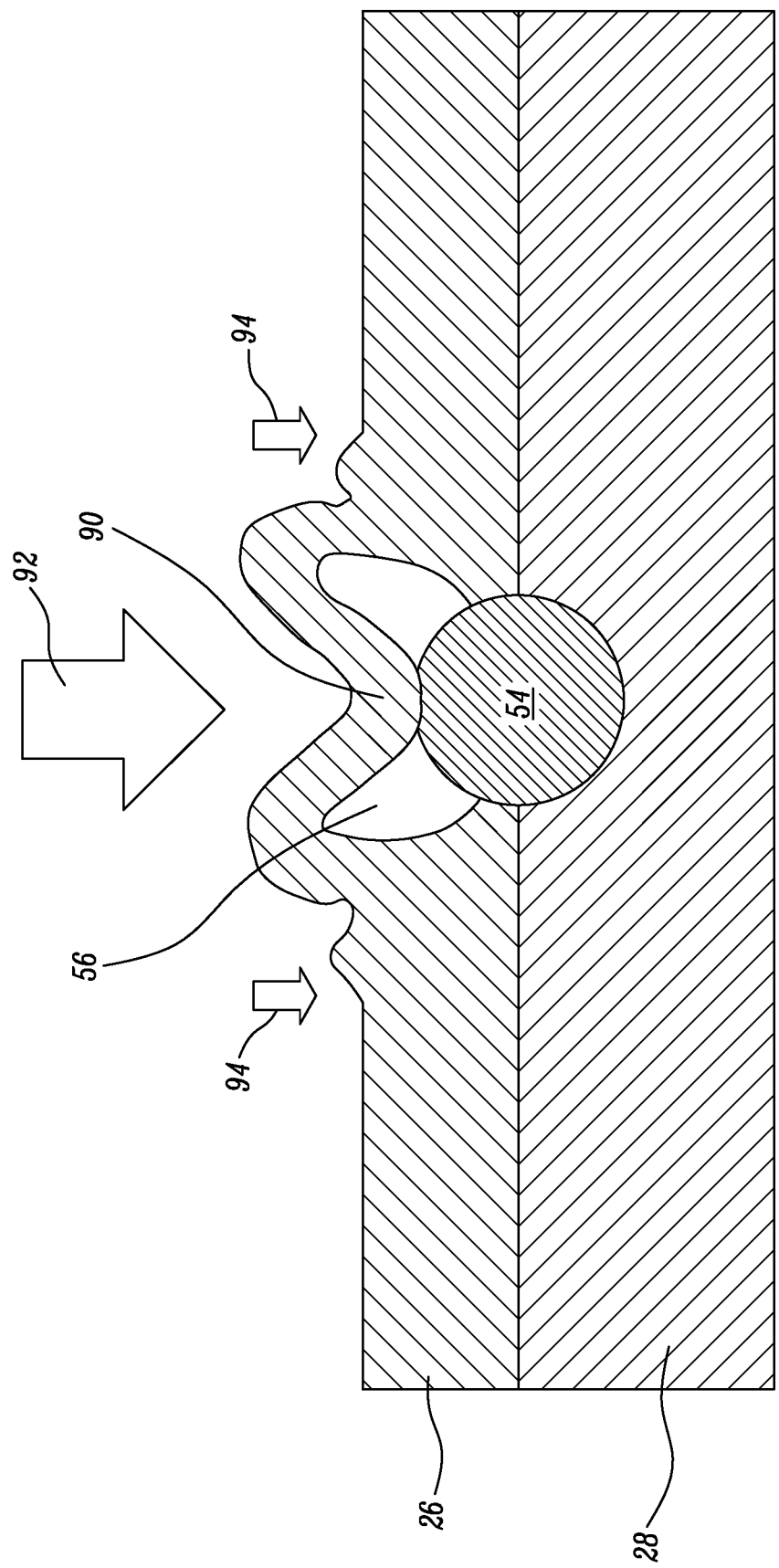
FIG. 8 is a longitudinal section through a portion of a joint showing a retainment feature for the connection member.

In an example shown in FIG. 8, the first member 26 comprises a deformable portion 88. The deformable portion 88 is substantially 'M-shaped'. A tool may apply a force 92 to the deformable portion 88, such that the apex 90 of a central portion of the 'M shape' engages the retaining member 54. The tool may comprise a roller.

Further deformation may be applied by a force 94 adjacent the deformable portion 88. This may result in further deformation at the first member/retaining member interface and/or the first member/second member interface to further retain the retaining the member.

In an example, the tenon 72 is retained in the cavity 74 using a wedge 100, as shown in FIG. 6. The tenon 72 comprises a bulbous portion 99 that engages a lip 108 formed on the cavity 74 to retain the tenon 72 and prevent separation thereof, e.g. in an axial direction. The cavity may have a similar bulbous profile to that of the tenon.

Figure 6A:
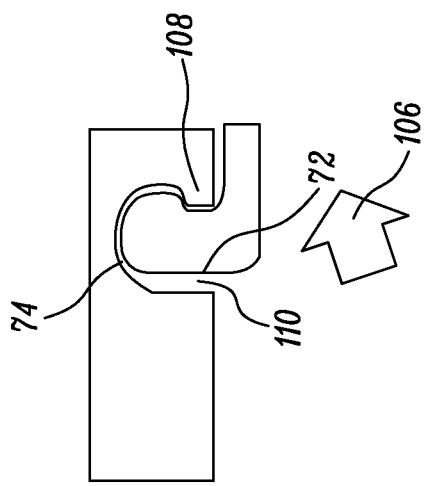
FIGS. 6a-6f show plan views of a further example of a joint alignment feature during assembly.

As shown in FIG. 6a, the tenon 72 is inserted into an aperture 102 located at the mouth of the cavity in the axial direction 104. The aperture 102 is sized to allow the bulbous portion 99 to enter the cavity.

Figure 6B:
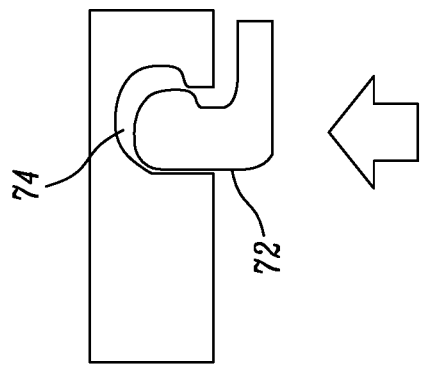

In FIG. 6b, the tenon 72 is fully inserted into the cavity 74.

Figure 6C:
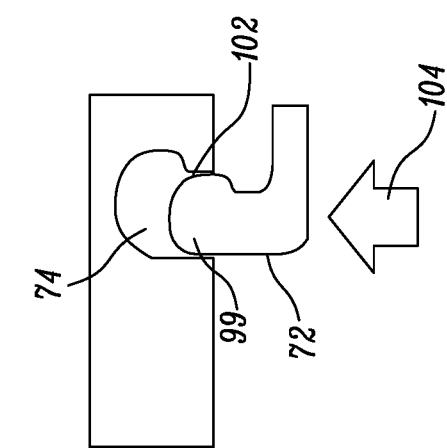

In FIG. 6c, the tenon 72 is moved in a lateral direction 106 such that the bulbous portion 99 is retained by the lip 108. A gap 110 is left between the bulbous portion 99 and a side wall of the cavity 74.

Figure 6D:
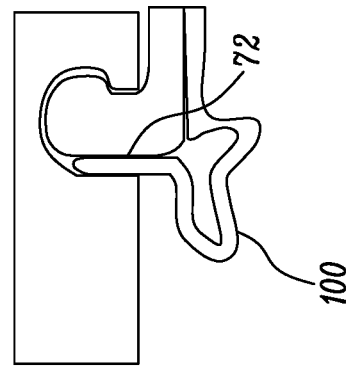
Figure 6E:
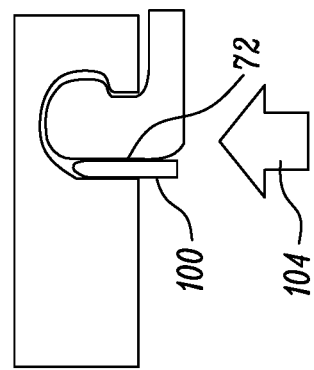

In FIGS. 6d and 6e, the wedge 100 is inserted into the gap 110 to prevent lateral movement of the tenon 72. An axial force 104 is applied to the wedge 100 to secure the wedge 100 between the cavity wall and the bulbous portion 99.

Figure 6F:
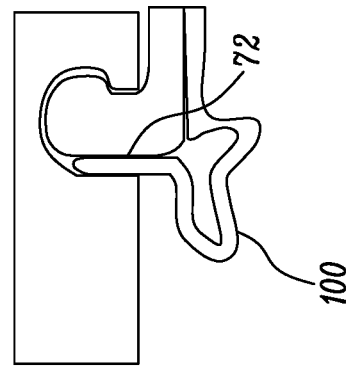

FIG. 6f shows a wedge 100 comprising a ribbon or elbow structure. The ribbon may be attached to an outer portion of the tenon 72.

The arrangement shown in FIG. 6 may be used where a relative lateral movement between the first and second member occurs in use. For example, where the first and second member are annular, the lateral movement may occur due to a torsional force between the first and second member. The arrangement is configured so that the tenon 72 is pushed against the lip 108 due to the lateral movement of the second member in lateral direction 106. Therefore, the tenon 72 is in tighter engagement with the cavity 74, strengthening the joint.

In an example, the first and/or second member comprise a tubular section extending in the axial direction. The tubular section may comprise an increased thickness adjacent and/or across the joint assembly 24.

In an example, the first and/or second member comprise a portion of an aircraft.

In an example, the first and second members comprise a first and second fan casing for a gas turbine engine.

In an example, the first and/or second member comprise a portion of an aerofoil. In an example, the first and/or second member comprise a portion of a wing spar.

The first and/or second members may be curved along the axial direction. The first and second member may be curved such that the joint assembly 24 is curved in the axial direction.

The joint assembly 24 may comprise a corner. For example, the first member 26 may be at a first angle and the second member 28 may be at a second angle and the joint assembly 24 spans between the first and second angle. The corner may arcuate. The corner may be substantially angular.

In an example, the joint assembly 24 is located in a recess in a structure surrounding the joint assembly 24.

The first and/or second member may comprise a metallic material. The first member 26 and the second member 28 may comprise a different metallic material. The metallic material in the first member 26 may require different processing parameters compared with the metallic material in the second member 28. For example, the metallic material in the first member may require a different heat-treatment regime to the metallic material in second member 28.

The first and/or second member may comprise a non-metallic material. The first and/or second member may comprise organic matric composites and/or ceramic matrix composites.

At least part of the joint assembly 24 may be manufactured using Additive Layer Manufacturing. At least part of the joint assembly 24 may be manufactured using one or more of: 5-axis machining; near net shape Hot Isostatic Pressing; or casting.

The joint assembly 24 may be manufactured in situ to provide a pre-joined joint assembly. For example, the first or member 26 is provided in a solid, completed form. The second member is then manufactured using the solid member as a guide or mould and is manufactured such that second member is pre-joined to the first member to provide a complete joint assembly 24. The second member may be formed via powder metallurgy or composite forming in situ.

The improved joint assembly may provide a joint assembly of reduced weight.

The joint assembly disclosed herein may allow a joint to be provided in a smaller envelope, or other space constraint. The improved joint assembly may provide for a reduction in aerodynamic drag.

The improved joint assembly accommodates changes in stiffness and strain of the different thermal masses of the joined members during a heating/cooling cycle.

The improved joint assembly may allow differential thermal expansion of the joined members to promote tightening of the joint.

The improved joint assembly accommodates differential transverse movement of the joined members.

The improved joint assembly may allow visual inspection of the joint.

The improved joint assembly may minimise the part count required for assembly of the joint.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A joint assembly joining first and second annular components about a common axis extending along an interface between the first and second annular components,
the first annular component comprising a first end portion having a radially outwardly facing surface shaped to fit radially inside a second surface of a hollow second end portion of the second annular component so as to form an interface between the opposing first and second surfaces,
wherein the first and second surfaces each comprise a concavity extending laterally with respect to the common axis such that when the first and second surfaces are opposingly arranged the opposing concavities define a cavity at the interface,
the assembly comprising a retaining member insertable into the cavity at the interface to prevent axial separation of the first and second components,
wherein one of the first and second end portions comprises a free end axially spaced from the concavity and the other of the first and second end portions comprises an axially extending recess arranged to receive the free end, wherein the free end includes a protrusion that is axially insertable into the recess and the recess thereby covering both opposing side surfaces of the protrusion so as to prevent relative movement between the first and second component in a radial direction, the protrusion having an end face substantially perpendicular to a direction of the extending axis,
wherein the first and second end portions are annular in form and the protrusion and/or recess extends in a circumferential direction, and
wherein the protrusion end face includes a tenon projecting from a portion of the protrusion end face, the portion being less than an entire portion of the protrusion end face, the recess includes a corresponding slot arranged to receive the projecting tenon, and when the projecting tenon is received in the slot, both side surfaces of the projecting tenon are fully covered by the slot.

2. The joint assembly according to claim 1, wherein the protrusion comprises a reduced wall thickness relative to the respective first or second end portion.

3. The joint assembly according to claim 1, wherein the recess is internal within a depth of the other of the first and second member.

4. The joint assembly according to claim 3, wherein the recess is beneath an overhang portion of the first or second member.

5. The joint assembly according to claim 1, wherein the interface spans a depth of the joint assembly between opposing first and second outer surfaces of the joint assembly, wherein the interface comprises an intermediate section having an axial length defining the extent of the overlap between the first and second end portions.

6. The joint assembly according to claim 5, wherein a point at which the interface meets the first outer surface is axially offset from a point at which the interface meets the second outer surface.

7. The joint assembly according to claim 5, wherein the intermediate section of the interface has an axial length greater than the axial offset between points at which the interface meets the first and second outer surface.

8. The joint assembly according to claim 5, wherein the free end comprises a protrusion that is axially insertable into the recess so as to prevent relative movement between the first and second component in a radial direction, and wherein the intermediate section of the interface is parallel with the projection and/or recess.

9. The joint assembly according to claim 1, wherein the cavity and retaining member are elongate in form.

10. The joint assembly according to claim 1, wherein both of the first and second end portions comprise a projection and both of the first and second portions comprise a recess so as to provide a double lapped joint.

11. The joint assembly according to claim 1, wherein the slot is arranged to constrain the tenon in a lateral direction relative to said axis.

12. The joint assembly according to claim 1, wherein the projection and/or recess comprise an obliquely angled or curved end face.

13. A gas turbine engine that includes a joint assembly according to claim 1.

14. The joint assembly according to claim 1, wherein the projecting tenon comprises a deformable portion configured to be inserted into the slot and deformed therein.

15. The joint assembly according to claim 14, wherein the slot includes a mandrel configured to push the deformable portion outward upon insertion of the projecting tenon into the slot.

16. The joint assembly according to claim 14, wherein the projecting tenon is comprised of a magnetic or ferromagnetic material and is detachable from the one of the first and second end portions.

17. The joint assembly according to claim 1, wherein at least one of the first surface and the second surface is comprised of a deformable material in a region of the concavity thereof, and wherein the deformable material is deformed to engage the retaining member.

* * * * *